J. WERNER.
CANDY CASTING MACHINE.
APPLICATION FILED OCT. 13, 1913.

1,198,798.

Patented Sept. 19, 1916.
6 SHEETS—SHEET 1.

Fig. 1.

Witnesses:
Clarence W. Carroll
L. Thon

Inventor:
John Werner
by his attorneys
Davis & Dorsey

J. WERNER.
CANDY CASTING MACHINE.
APPLICATION FILED OCT. 13, 1913.

1,198,798.

Patented Sept. 19, 1916.
6 SHEETS—SHEET 3.

Fig. 4.

Witnesses:
Clarence W. Carroll
L. Thon

Inventor:
John Werner
by his attorneys
Davis & Dorsey

J. WERNER.
CANDY CASTING MACHINE.
APPLICATION FILED OCT. 13, 1913.

1,198,798.

Patented Sept. 19, 1916.
6 SHEETS—SHEET 4.

Witnesses:
Clarence W. Carroll
L. Thon

Inventor:
John Werner
by his attorneys
Davis & Dorsey

J. WERNER.
CANDY CASTING MACHINE.
APPLICATION FILED OCT. 13, 1913.

1,198,798.

Patented Sept. 19, 1916.
6 SHEETS—SHEET 5.

Witnesses:
Clarence W. Carroll
L. Thon

Inventor:
John Werner
by his attorneys
Davis & Dorsey

J. WERNER.
CANDY CASTING MACHINE.
APPLICATION FILED OCT. 13, 1913.

1,198,798.

Patented Sept. 19, 1916.
6 SHEETS—SHEET 6.

Witnesses:
Clarence W. Carroll
L. Thon

Inventor:
John Werner
by his attorneys
Davis & Dorsey

UNITED STATES PATENT OFFICE.

JOHN WERNER, OF ROCHESTER, NEW YORK.

CANDY-CASTING MACHINE.

1,198,798.  Specification of Letters Patent.  Patented Sept. 19, 1916.

Application filed October 13, 1913. Serial No. 794,922.

*To all whom it may concern:*

Be it known that I, JOHN WERNER, a citizen of the United States, and resident of Rochester, in the county of Monroe and State of New York, have invented certain new and useful Improvements in Candy-Casting Machines, of which the following is a specification.

This invention relates to machines of the type in which candy is cast in molds formed by impressions in loose starch contained in suitable trays or receptacles. In United States Letters Patent No. 959,664, granted to me May 31, 1910, I have disclosed a machine which is adapted to produce the molds by mechanism acting automatically to impress a suitable pattern in the starch, and to cast candy in such molds by dropping syrup or candy composition into the depression in the starch, this machine having mechanism for transferring the starch-trays successively from the mold-forming mechanism to the candy-dropping mechanism. The present invention relates particularly to improvements in the machine of said patent.

One object of the invention is to produce a machine, of the type in question, in which the starch-molds shall be produced with greater precision and certainty, and particularly to avoid the occurrence of loose particles of starch upon the impressed surfaces of the mold. To this end I employ pattern-actuating mechanism which is adapted to cause the pattern to be impressed in the starch a plurality of times, together with means for rapping the pattern during or between the impressing operations, so that particles of starch which adhere to the pattern are thereby loosened and allowed to fall back into the mold, and are then pressed smoothly into the mold-surface by the repeated action of the pattern.

Another object of the invention is to provide the machine with improved means for regulating the vertical distance between the mold and the candy-dropping means, without the necessity of raising or lowering the latter for this purpose, and to this end I employ means by which the mold-support and the means for actuating and counterbalancing the pattern-support may be simultaneously raised or lowered through equal distances, so as to maintain these parts in proper operative relation while changing the relative position of the mold-support and the candy-dropper.

Another object of the invention is to adapt the machine for use with starch-trays of different widths, and at the same time to provide for feeding the starch-trays with precision after each operation of the candy-dropping means, to bring the successive rows of mold-impressions beneath the latter. To this end I employ an adjustable ratchet-mechanism of novel form in connection with the conveyers by which the starch-trays are carried through the machine.

Other objects of the invention, and the features of construction by which they are attained, will be set forth in connection with the following description of the preferred embodiment of the invention.

In the accompanying drawings.

The illustrated embodiment of the invention is a machine adapted to employ the usual wide, shallow starch-trays, and three such trays 11, 12 and 13 are shown in position on the machine, the first tray 11 being supported upon the table 14 in position to be acted upon by the pattern 15.

The pattern 15 is of any ordinary or suitable form, being provided with depending projections 16, arranged in rows and formed to correspond to the depressions in the starch which are to receive and mold the syrup or candy. This pattern is carried by a vertically movable pattern-support which, as shown particularly in Figs. 2 and 4, comprises parallel longitudinal members 17, 18 and 19, a transverse central member 20, and end-members 21 and 22, all cast integrally.

Figure 2:
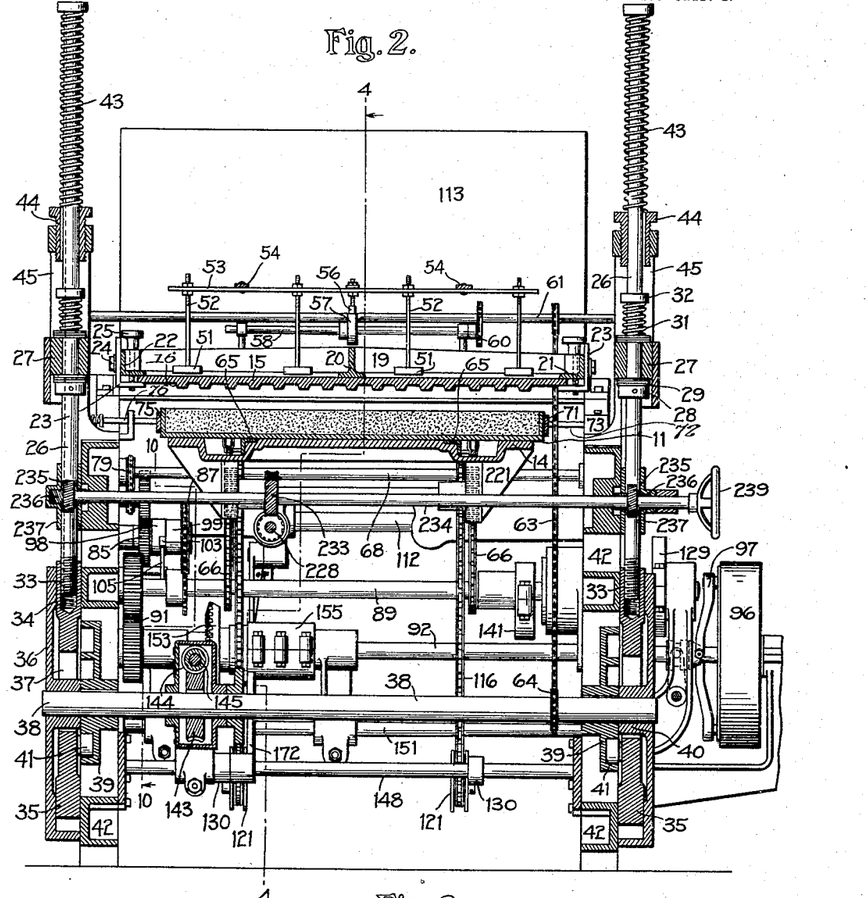
Fig. 2 is a vertical section of the same on the line 2—2 in Fig. 1, looking from right to left in the latter figure, and on a slightly larger scale.

In order that the pattern may be readily removed and replaced when necessary, it is fixed at its ends to the pattern-support by means of clamp-plates 23, which have flanges engaging the lower surface of the pattern, as shown in Fig. 2, and vertical portions slotted to receive screws 24 by which they are adjustably fixed to the pattern-support. Hand-screws 25, threaded into the clamp-plates, draw them tightly against the pattern so as to clamp the pattern in operative position.

The relative vertical movement, by which the pattern is impressed into the starch in the tray, is imparted to the pattern-carrier by mechanism including two vertical slide-rods 26. These rods pass loosely through sleeves 27 projecting from the ends of the pattern-support, and the sleeves are supported by collars 28 fixed to the rods, washers 29 being interposed between the parts to adjust their relative position. The sleeves are normally held down against the washers and collars by means of springs 31, coiled around the rods 26 and seated against collars 32 also fixed on the rods.

The lower ends 33 of the slide-rods 26 are threaded, as shown in Fig. 2, and are screwed into vertically movable slides by which the rods are actuated. Each of these slides comprises upper and lower members 34 and 35, which are guided in bearings in a casing 36 fixed to the main frame 42 of the machine. The central portion 37 of the slide is yoke-shaped, so as to clear a transverse cam-shaft 38 which carries a cam 39 at each end. Each slide is provided with a cam-roller 41 which engages a closed cam-path in the face of the corresponding cam 39. Accordingly, as the cam-shaft is rotated, the cams cause the slides and the slide-rods to move vertically in unison, in accordance with the form of the cam-paths.

In order that the considerable weight of the pattern-support and its actuating mechanism may be partially counter-balanced, to reduce the load on the cam-mechanism, a counter-balancing spring 43 is coiled about the upper part of each slide-rod 26, with its upper end engaging a head on the rod, while the lower end of each spring rests upon a sleeve 44 which is threaded into a bracket 45 extending upwardly from the main frame 42 of the machine.

Figure 3:
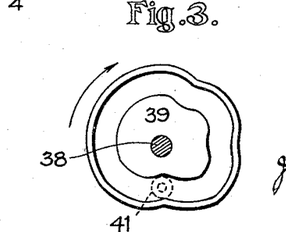
Fig. 3 is a detail-view, in side-elevation, of one of the cams for actuating the pattern-support.

The cams 39 are formed, as shown in Fig. 3, to actuate the pattern-support in a manner which is novel in the present invention. When the cam-shaft 38 is rotated, by means hereinafter described, the pattern-support and the pattern are first lowered from the position shown in Fig. 2, until the pattern is fully impressed in the starch in the tray 11. The pattern-support and pattern are then raised slightly, so as to free the pattern from the starch. The pattern is then again depressed, and is then finally raised clear of the tray, so that the tray may be removed and another substituted. The function of the springs 31, constituting a part of the connections between the slide-rods and the pattern-support, is to provide for a yielding downward movement of the pattern-support, in case of any accidental obstruction to this movement, such as might occur where a tray is not properly placed upon the table 14, thus avoiding injury to the pattern or the machine; but during the normal operation of the machine these springs do not yield, as the resistance of the starch to the movement of the pattern is slight.

Figure 1:
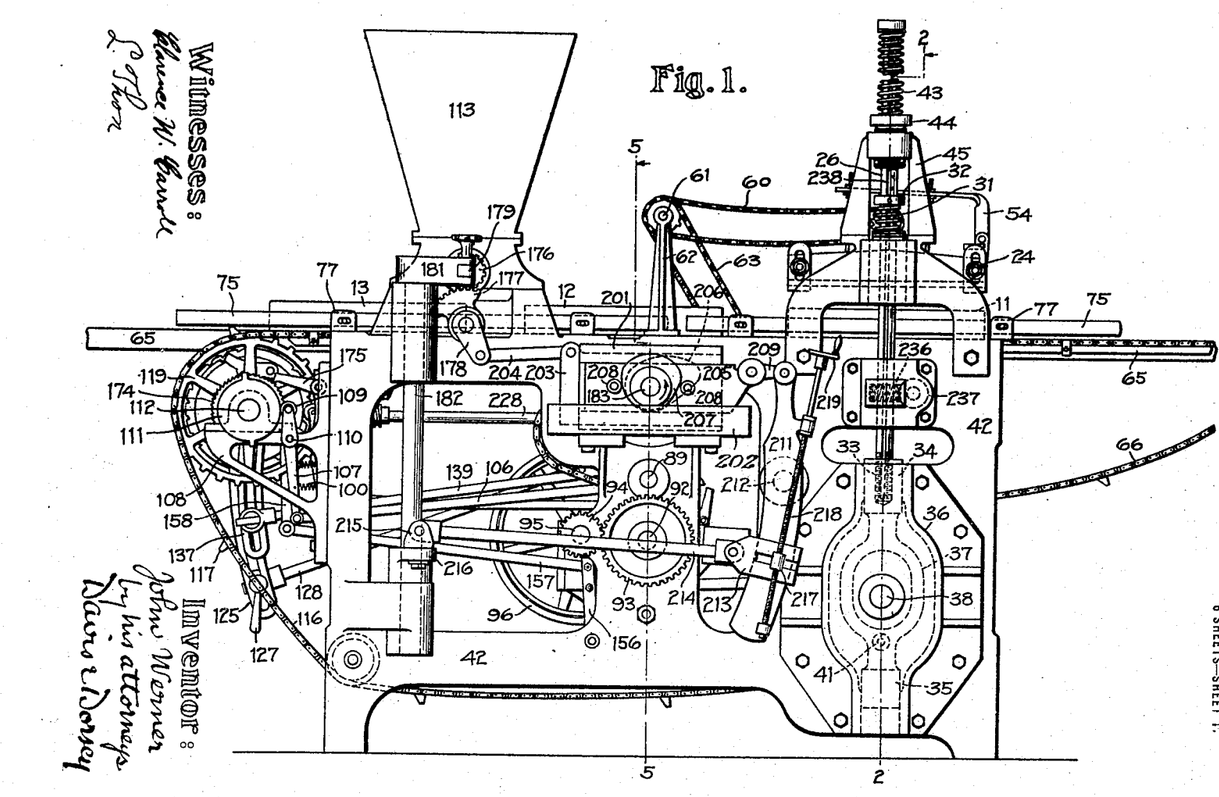
—Figure 1 is a side-elevation of a starch-molding machine embodying the present invention.
Figure 4:
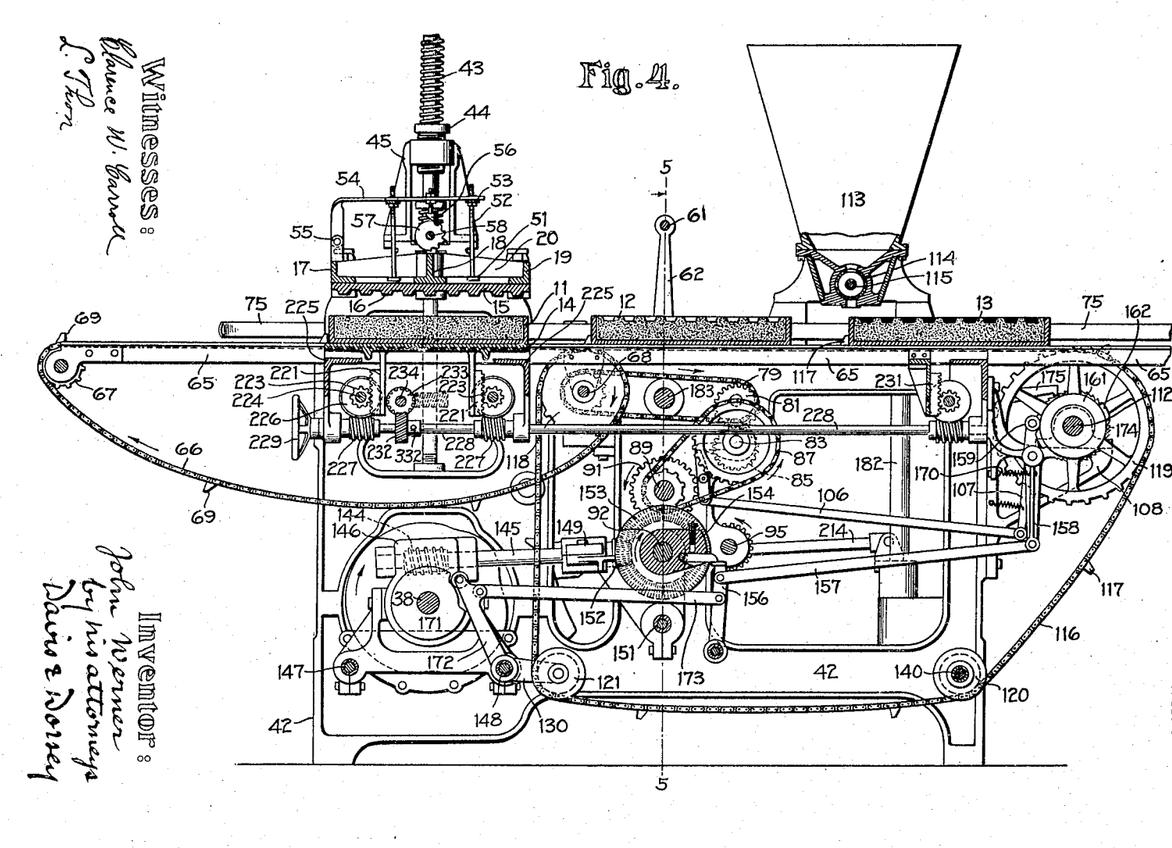
Fig. 4 is a longitudinal vertical section on the line 4—4 in Fig. 2, looking from right to left in the latter figure.

The means for rapping the pattern during the mold-forming operation are shown particularly in Figs. 1, 2 and 4. Metal blocks 51 are fixed to the lower ends of stems 52, carried by two parallel bars 53. The bars 53 are fixed, in turn, to arms 54 which are pivoted, at 55, on lugs projecting upwardly from the longitudinal member 17 of the pattern-support.

A cam-follower 56, fixed to the frame just described, engages a cam 57 which is mounted on a shaft 58 journaled in bearings on the pattern-support. This cam has a number of projections adapted to impart a series of vertical movements to the cam-follower and the frame, so that the blocks 51 are caused to tap the upper surface of the pattern rapidly during a part of each rotation of the cam-shaft 58. This shaft is actuated by means of a sprocket-chain 60, which connects it with a sprocket on a countershaft 61 journaled in fixed uprights 62 on the main frame of the machine. The shaft 61 is connected, in turn, with the cam-shaft 38 by means of a sprocket-chain 63 extending to a sprocket-wheel 64 on the cam-shaft 63, as shown in Fig. 2. Accordingly, at each rotation of the latter the rapping-mechanism is operated so as to rap the pattern during the impressing movements above described. After the pattern has been first impressed and then withdrawn from the starch this rapping causes any loose particles of starch, adhering to the pattern, to fall back into the mold. By the succeeding impressing movement of the pattern these loose particles are then pressed smoothly into the mold-surface, and then the pattern is finally freed from the starch, leaving both the mold and the pattern free from loose particles.

To support the trays in their passage through the machine two longitudinal rails 65 are provided, these rails being in the form of angle-bars which are seated in recesses in the table 14, as shown particularly in Fig. 2, and extending thence for the entire length of the machine, in both directions, to and beyond the ends of the frame of the machine.

The trays of starch are supplied to the machine by an attendant, who places them successively upon the left-hand ends of the rail 65. The trays are then automatically drawn into position beneath the pattern-support by means of two endless conveyer-chains 66. These chains run over sprocket-wheels 67 journaled at the forward ends of the rails, as shown in Fig. 4, and the upper reaches of the chains extend alongside the rails. The chains pass, at their forward portions, around sprocket-wheels 67 (see Fig. 10) which are fixed on and actuated by a transverse shaft 68, which is driven by means hereinafter described. Each chain is provided with a series of lugs 69 which project upwardly above the rail 65 so that they may engage the edge of a tray resting thereon, and thus slide the tray along the rails when the chains are moved.

Figure 5:
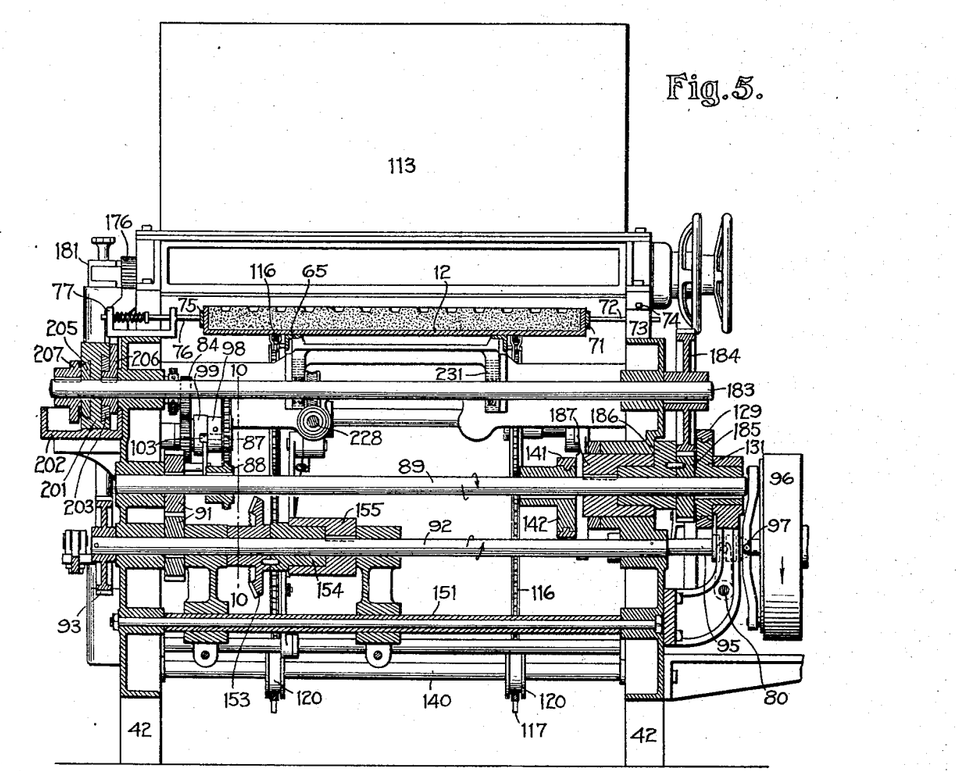
Fig. 5 is a vertical section on the line 5—5 in Fig. 4, looking from left to right in the latter figure.
Figure 11:
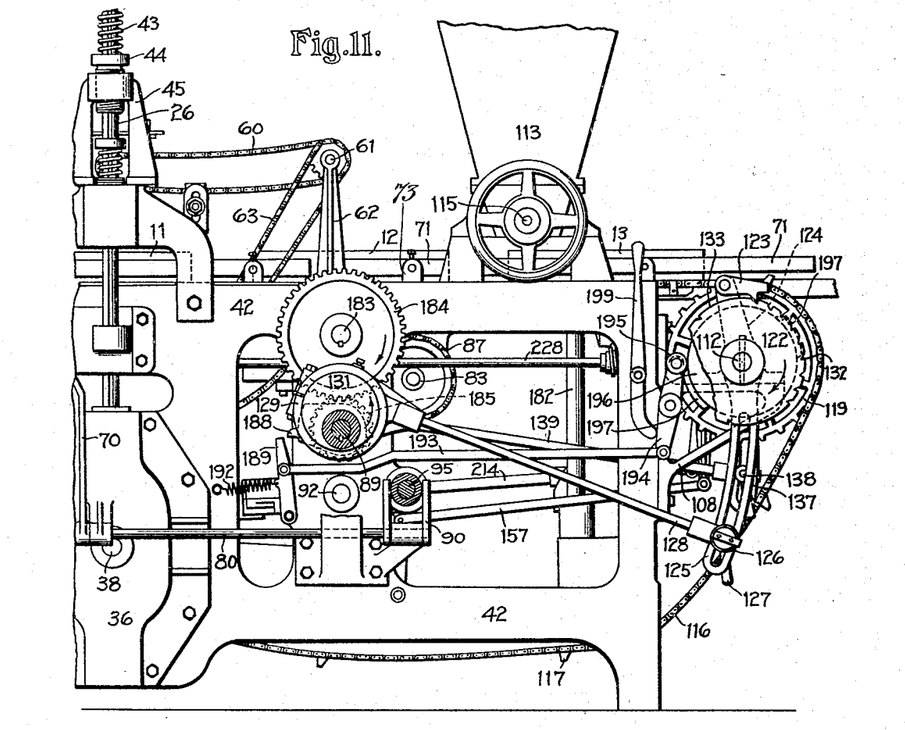
Fig. 11 is a partial side-elevation of the machine on the opposite side from Fig. 1.

To hold the trays in proper lateral position while they are in coöperative relation with the mold-forming mechanism and the candy-dropping mechanism, I employ a side-rail 71 which extends parallel with and somewhat above the rail 65, as shown in Figs. 5 and 11. This side-rail is supported by stems 72 which are adjustably fixed, in blocks 73 on the frame of the machine, by means of set-screws 74. This arrangement permits the side-rail to be adjusted laterally according to the width of the trays.

In previous machines it has been the practice to employ a single fixed side-rail, such as that just described. In the present machine, however, in order to insure that the trays shall remain in proper engagement with this side-rail, I employ a movable side-rail 75 at the opposite side of the machine, this rail being mounted upon spring-pressed plungers 76 which slide through brackets 77 on the frame of the machine, as shown in Fig. 5. By these means the trays are firmly engaged on both sides, so that they may have no lateral movement while passing through the machine.

Figure 10:
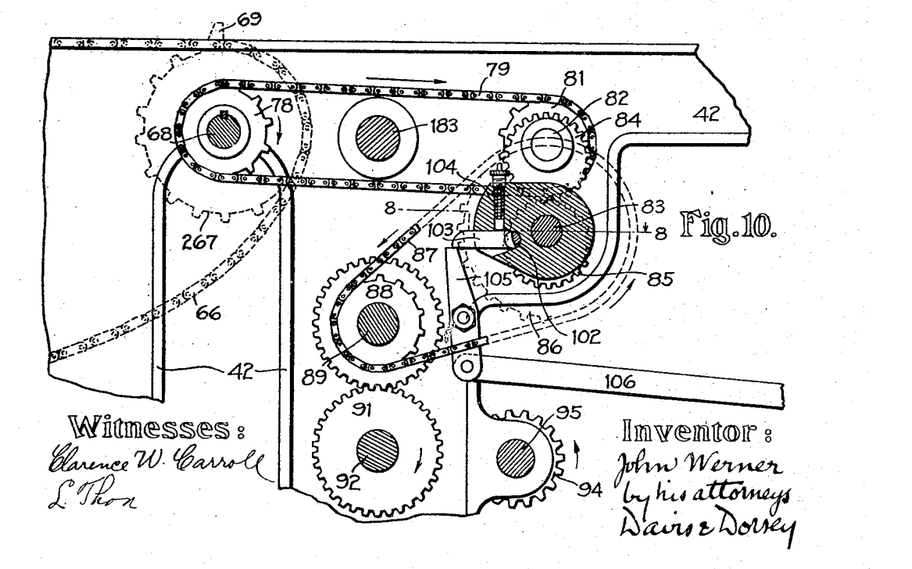
Fig. 10 is a partial vertical section of the machine, on the line 10—10 in Fig. 5, looking from right to left in the latter figure but on a larger scale.

Means are provided for moving the conveyer-chains 66 intermittently after the mold-impressions have been formed in each tray, in order to advance the tray toward the dropping-mechanism and substitute a fresh tray. For this purpose the shaft 68, as shown particularly in Fig. 10, is provided with a sprocket-wheel 78 which is connected, by a chain 79, with a sprocket-wheel 81 journaled on a stud 82 projecting inwardly from the frame of the machine. The sprocket-wheel 81 is fixed to a gear-wheel 84, which meshes with a second gear-wheel 85 journaled on a stud 83, also projecting from the frame. The gear-wheel 85 is connected, by means of an automatic clutch, with a sprocket-wheel 86 which is connected, by a chain 87, with a sprocket-wheel 88 fixed on a transverse shaft 89.

The shaft 89 is actuated by gears 91, which connect it with a transverse shaft 92 journaled in the frame of the machine. This shaft 92 is driven constantly by means of gears 93 and 94 which connect it, as shown in Fig. 1, with the main power-shaft 95 of the machine. This shaft 95 is journaled transversely in the frame of the machine, and is provided with a pulley 96 by which it may be connected with any suitable source of power. To permit the machine to be stopped and started at will the pulley is connected with the shaft by any ordinary or suitable clutch-mechanism 97. This clutch-mechanism is controlled, in the usual manner, by a forked arm 90, on a rock-shaft 80 which is provided with a hand-lever 70, all as shown in Figs. 5 and 11.

Figure 8:
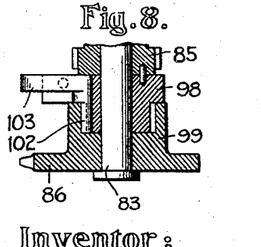
Fig. 8 is a horizontal section of one of the automatic clutches, on the line 8—8 in Fig. 10, looking downwardly.

The clutch above referred to, for throwing the conveyer-mechanism into and out of operation, is of a well known form in which a trip is employed to throw the clutch out of operation after each rotation. The construction of this clutch is shown particularly in Figs. 8 and 10. One of the clutch-members 98 is pinned to the gear 85, and this clutch-member carries a rocking key 102 which is adapted to be rocked into and out of engagement with a suitable recess in the second clutch-member 99. The key is controlled by means of an arm 103 and a spring-pressed plunger 104. The plunger tends to swing the arm in a direction to cause the key to operate, but a trip 105, pivoted on the frame of the machine, is adapted to engage the end of the arm 103, after each rotation of the clutch-members, and swing the arm in a direction to cause the key to disengage the clutch-member 99. The construction of this clutch is not further illustrated, for the reason that it is of a well known type.

In order that the motion of the mechanism may occur without any jar such as would tend to strain it or to disarrange the starch in the starch-trays, I provide for a gradually accelerated and retarded movement at the beginning and end of the feeding movement of the conveyer-chain 66. This is accomplished by making the gears 84 and 85 eccentric, as shown in Fig. 10, the original and final position of the gears, as shown in said figure, being such that the first movement of the gear 85 causes a much slower movement of the gear 84.

The operation of the conveyer-mechanism just described is timed by cam-mechanism at the rear of the machine. For this purpose the trip 105 is actuated by means of a rod 106 (Figs. 1 and 10), which is pivoted to an arm 107 depending from a rock-shaft 110 journaled in a bracket 108 at the rear end of the frame 42. An arm on the outer end of the rock-shaft 110 carries a cam-roller 109, which engages a cam 111 fixed on a transverse cam-shaft 112, which is also journaled on the brackets 108. This cam has two projections, as shown in Fig. 1, which act, through the connections just described, to trip the clutch shown in Fig. 10 after each half-rotation of the cam-shaft, and thus cause the conveyer-chain 66 to be actuated. The cam-shaft 112 is rotated by means hereinafter described.

The candy-dropper 113 may be of any ordinary or suitable form, but it is illustrated as provided with a rocking valve-sleeve 114 and a reciprocating piston-rod 115, which operate to control the delivery of the candy or sirup. These parts may be constructed in accordance with my said patent No. 959,664, or in any other suitable manner, their function being to drop measured quantities of material into the impressions in the mold at regular intervals between the feeding movements of the starch-tray beneath the dropper.

Each feeding movement of the conveyer-chains 66, which constitute what may be termed the "first conveyer", brings a tray from the position of the tray 11 in Fig. 4 to the position of the tray 12, which latter is an intermediate position between the mold-forming mechanism and the dropping-mechanism. To carry each tray from the position 12 to a position beneath the dropping-mechanism, and also to feed the tray step-by-step beneath the latter, I employ a second conveyer which is adapted to receive the trays from the first conveyer. This second conveyer comprises two endless chains 116, having lugs 117 adapted to engage the edges of the trays. The chains 116 pass over sprocket-wheels 118, which are journaled loosely upon the shaft 68. They extend thence alongside the rails 65 to a pair of sprocket-wheels 119, which are fixed on the cam-shaft 112. The lower reaches of the chains are guided by pulleys 120, journaled on a cross-brace 140 of the frame the machine, and by pulleys 121 journaled on arms 130 which are fixed on a second cross-brace 148, all as shown in Fig. 4.

Figure 9:
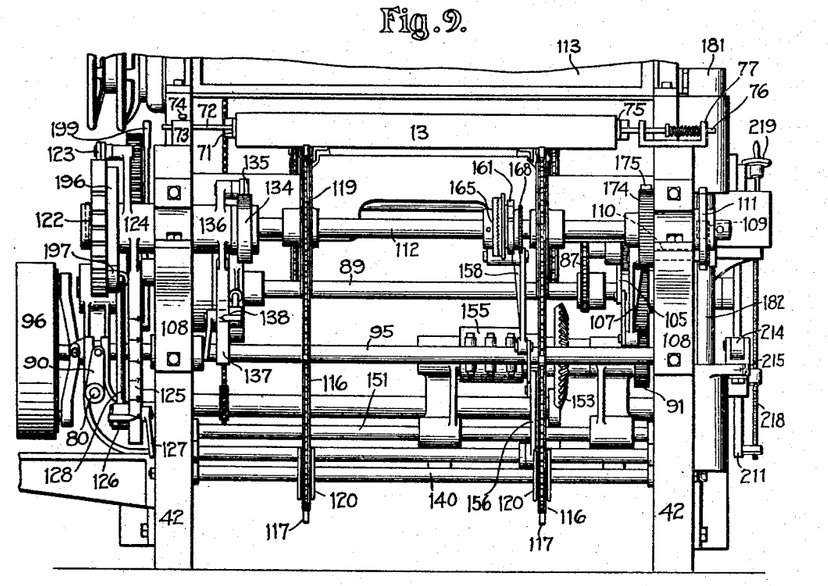
Fig. 9 is a partial rear-elevation of the machine.

The second conveyer has intermittent motions of two characters, produced by the operation of two separately adjustable ratchet-mechanisms, which act to rotate the cam-shaft 112. The first of these motions is the step-by-step motion by which the tray beneath the candy-dropper is fed from row to row after each operation of the dropper. The mechanism comprises a ratchet-disk 122, which is fixed on the shaft 112. One or more pawls 123, as shown in Figs. 9 and 11, coöperate with this disk, and are pivoted on the upper end of a lever 124 which swings loosely upon the cam-shaft. The lower arm 125 of the lever is slotted, and is curved so as to be substantially concentric with the shaft 89. In this lower arm a stud 126 is adjustably clamped by means of a hand-lever 127. This stud is pivoted to an eccentric-rod 128 extending from an eccentric 131 fixed on the shaft 89. As the shaft 89 rotates constantly during the operation of the machine the eccentric-mechanism causes the lever 124 to oscillate, thus moving the pawls 123 back and forth over the ratchet-disk. The disk is provided with two series of notches 132, which correspond in number to the number of rows of impressions in the starch-tray. The notches are also spaced at a proper distance to cause the necessary movement in the second conveyer and the starch-tray, so that each tray is fed from row to row and completely filled by the candy-dropper during somewhat less than one-half of a rotation of the cam-shaft 112. The remaining parts 133 of the periphery of the ratchet-disk are smooth, and they correspond in position to the movement of the cam-shaft during which the second movement above referred to is imparted to the conveyer. This second movement is that by which the filled tray is removed entirely from the candy-dropper and another tray is brought from the intermediate position into position beneath the dropper, with its first row of impressions suitably placed to receive the candy.

Figure 12:
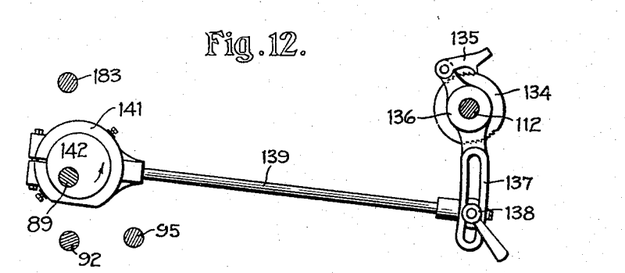
Fig. 12 is a side-elevation of parts of the mechanism for actuating the second tray-conveyer when removing one tray from the candy-dropper and bringing another tray into coöperative relation to the dropper.

The mechanism for producing the second motion of the conveyer is shown particularly in Figs. 9 and 12. A ratchet-disk 134 is fixed on the cam-shaft 112, and is engaged by one or more pawls 135 pivoted at the upper end of a lever 136 which rocks loosely upon the shaft 112. The lower arm 137 of this lever is slotted and is curved concentrically with the shaft 89. A pivot-stud 138 is adjustably fixed in the slotted arm, and is connected, by an eccentric-rod 139, with an eccentric-strap 141 embracing an eccentric 142 on the shaft 89. Accordingly the constant rotation of the shaft 89 causes constant oscillation in the lever 136.

The cam 134, as shown in Fig. 12, has two long smooth portions in its periphery, which correspond in position with the toothed portions of the ratchet-disk 122, so that the ratchet-mechanism of Fig. 12 is idle during the step-by-step feeding of the trays as the pawls 135 slide freely over the smooth portions of the disk 134. After the pawls 123 have acted upon the last notch 132 of one of the series of notches 132 in the disk 122, however, the disk 134 has been rotated to a position in which the pawls 135 may coöperate with one of two series of teeth on the periphery of the disk 134. The mechanism of Fig. 12 thus acts to impart a longer movement to the second conveyer, by which the filled tray is removed and the next tray is brought into position beneath the candy-dropper.

It will be noted that the movements imparted to the cam-shaft 112, and thence to the second conveyer, are smoothly accelerated and retarded at their beginning and ending, owing to the use of eccentrics as the actuating-means. A valuable feature of the arrangement by which two independently-adjustable ratchet-mechanisms are employed for the two different movements of the second conveyer is the fact that by this arrangement the machine may be adapted to operate with starch-trays of various lengths, and with various numbers of rows of mold-impressions, spaced at any required distance. The number and spacing of the rows of impressions determines the number and spacing of the teeth 132 in the ratchet-disk 122, and accordingly, when any change is made in this respect this disk is removed from the end of the cam-shaft and another disk substituted, having the teeth properly spaced according to the changed requirements. Whatever may be the number and spacing of the teeth 132, however, the pawl-mechanism may be adjusted to coöperate properly with the teeth by moving the pivot-stud 126 in the slotted arm 125 of the lever, and to assist in making this adjustment the arm may be graduated, and a pointer provided upon the pivot-stud, as shown in Fig. 9. The length of the transferring movement, after each tray has been filled by the candy-dropper, depends upon the width of the trays employed, but this movement, in turn, may be adjusted by adjusting the pivot-stud 138 in the slotted arm 137 of the ratchet-lever 136, thus causing the pawls 135 to pass over more or less of the teeth on the disk 134 before making their operative return-movement by which the cam-shaft is operated. In making both of these adjustments the amount of movement of the pawl-carrying levers is so regulated that the pawls, on their return movement, just clear the ratchet-teeth which they are intended to coöperate with, so that there shall be no substantial lost-motion at the beginning of the operative movement, thus avoiding any shock and sudden starting of the conveyers.

Since the time required for the operation of the second conveyer is variable, being determined in accordance with the length of the trays and the number of rows of impressions therein, it is necessary to throw the mold-forming mechanism into and out of operation at times determined by the operation of the second conveyer. Accordingly I employ for this purpose a mechanism including an automatic clutch similar to that illustrated in Fig. 8 and previously described. The cam-shaft 38, which furnishes power for moving the pattern-support, is provided with a worm-wheel 143, which meshes with a worm 144 on a longitudinal shaft 145, as shown in Figs. 2 and 4. The shaft 145 is journaled, at one end, in a casing 146, which is supported by a bracket fixed on the tie-rods 147 and 148 constituting a part of the main frame of the machine. The rear end of the shaft 145 turns in a bearing 149, which is similarly supported on a tie-rod 151, and a bevel-pinion 152 is fixed on this end of the shaft, in engagement with a bevel-gear 153 which is journaled loosely on the shaft 92. This gear 153 is fixed to one member 154 of the automatic clutch, the other member 155 being fixed on the shaft 92, so that by the action of the clutch the gear 153 may be rotatively connected with and disconnected from the shaft 92 at suitable times during the constant rotation of the shaft. This clutch is controlled by a trip 156, as shown in Fig. 4, in the same manner as in the case of the clutch previously described, and during a portion of the operation of the machine this trip is in operative position, as shown in said figure, thus holding the clutch in inoperative position so that the cam-shaft 38 is not rotated, and the pattern-support remains in its uppermost position.

Figures 6, 7:
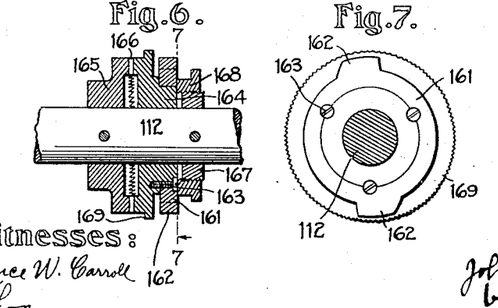
Fig. 6 is a vertical section of a portion of the mechanism for controlling the operation of the clutch by which the mold-forming mechanism is thrown into and out of operation.
Fig. 7 is a vertical section on the line 7—7 in Fig. 6, looking from right to left in the latter figure.

The clutch 154—155 is thrown into operation by cam-mechanism connected with the cam-shaft 112 at the rear of the machine. For this purpose a rod 157 pivoted to the trip 156, is connected with the lower end of a cam-lever 158, which is pivoted on one of the brackets 108. This lever carries, at its upper end, a cam-roller 159 which engages a cam 161 upon the shaft 112. This cam has two diametrically-opposite projections 162, as shown in Figs. 4 and 7, these projections being so arranged as to engage the cam-roller at suitable points in the operation of the machine to throw the pattern-forming mechanism into operation.

Owing to the arrangement of the first and second conveyers, as shown particularly in Fig. 4, it is necessary that their movements be accurately coördinated, in order that they may transfer the trays smoothly and without interference with each other. It will be apparent that at the moment when the pair of lugs 69 of the first conveyer-chains 66, which are in the act of sliding the tray along the rails 65, reach a position above the shaft 68, as shown in Fig. 4, the second conveyer must be in such a position that none of its lugs 117 are projecting upwardly in the path of movement of the tray under the influence of the first conveyer. The first conveyer stops when it has brought the tray to the intermediate position 12 in Fig. 4, and the movement of this first conveyer must not be resumed until after the second conveyer has moved so that a pair of its lugs 117 may engage the tray at the position 12 and move it farther along the rails 65 in the act of transferring it from the intermediate position to a position of operation with respect to the candy-dropper. This coöperative relation of the conveyers is secured by the cam-mechanism previously described, and it will be further apparent that since the operation of the pattern-forming mechanism must occur during the dwell of the first conveyer, in which the tray is permitted to remain in the position 11 on the table 14, it is necessary to coordinate the movements of the mold-forming mechanism accurately with the movements of the first conveyer, particularly as the movements of this mechanism are preferably arranged to occupy the entire period of such dwell so as to secure as slow a speed as possible in the movements of the pattern. For these reasons I provide means by which the position of the cam 161 on the shaft 112 may be accurately and readily adjusted, these means being shown particularly in Figs. 6 and 7. The cam 161 is fixed, by means of screws 163, to a hub 164 which is loosely mounted on the shaft 112. This hub has beveled teeth 166 on its left-hand face, which coöperate with similar teeth on a collar 165 which is pinned to the shaft 112. A second collar 167, pinned to the shaft, is threaded on its periphery and is engaged by a threaded locking-ring 168, which is screwed against the hub 164 so as to maintain the teeth 166 in operative engagement, thus locking the cam in adjusted position on the shaft. When it is necessary to change this position the ring 168 is unscrewed, thus permitting disengagement of the teeth 166, and the hub and the cam may then be readily turned by means of a knurled flange 169 on the hub.

The cam-mechanism last described determines the time at which the operation of the pattern-forming mechanism is started, but the time at which this action is terminated depends upon the time required to produce a full rotation in the cam-shaft 38 by which the pattern-support is actuated. Accordingly I provide means for holding the trip 156 in inoperative position during one complete rotation of the shaft 38, these means then acting to release the trip and cause the clutch to be thrown into inoperative position. As shown in Fig. 4, a spring 170 attached to the lever 158, tends to move the parts in a direction to throw the trip 156 into operative position, but a cam 171, fixed to the shaft 38, engages a cam-roller on a lever 172, which is connected, by a rod 173, with a trip 156. This cam has a recess in which the cam-roller may rest when the trip is in operative position, as shown in Fig. 4, but the greater part of the periphery of the cam is extended so as to hold the trip out of operation during the rotation of the cam and the cam-shaft. As soon as the trip is thrown out of action by one of the projections 162 on the cam 161, the cam 171 is rotated sufficiently to hold the trip out of operation after the projection 162 disengages the roller 158, and until a complete rotation of the shaft 38 has brought the recess in the cam 171 again into engagement with the roller on the lever 172, whereupon the trip 156 acts to throw out the clutch 154—155 and thus stop the operation of the mold-forming mechanism.

In order to prevent any accidental backward movement in the cam-shaft 112 during the idle return movements of the ratchet-mechanisms by which it is actuated, a ratchet-wheel 174 is fixed on the shaft, and is engaged by one or more pawls 175 pivoted on the frame of the machine.

The mechanism by which the moving parts of the syrup-dropper 113 are actuated is shown particularly in Figs. 1 and 5. The cylindrical valve-member 114 is provided, at one end, with a pinion 176 which meshes with a segmental gear 177 pivoted on the frame of the machine. An arm 178 is connected with this gear, for the purpose of rocking it to produce oscillations in the pinion and the valve. The piston-rod 115 is provided, at its end, with a head 179 which is pivoted in the end of a rocker-arm 181 fixed on a vertical rock-shaft 182 journaled in bearings on the frame of the machine. The rocking movement imparted to this shaft, by means hereinafter described, causes longitudinal reciprocation of the piston-rod in timed coöperation with the rocking movements of the valve.

Movement is imparted to the mechanism just described by means of a shaft 183 which is journaled transversely in the main frame 42 of the machine. A gear 184 fixed on the end of the shaft, as shown in Fig. 5, meshes with a gear 185 which is fixed to one member 186 of an automatic clutch similar to those previously described. The other member 187 of the clutch is fixed on the shaft 89, so as to rotate constantly.

The clutch 186—187 is provided with a trip-finger 188, which coöperates with a trip 189, as shown in Fig. 11. This trip is pivoted on the frame of the machine, and is normally held in inoperative position by a spring 192. It is connected, however, by means of a rod 193, with a lever 194 which carries a cam-roller 195 at its upper end. This roller engages a cam 196 fixed on the cam-shaft 112, this cam having two diametrically-opposite projections 197 which engage the cam-roller and, through the connections just described, throw the trip 189 into operation at suitable times in the cycle of operations in the machine; namely, at the time when one of the trays has been completely filled by the syrup-dropper and the mechanism is about to remove this tray and substitute another. During this period it is necessary to interrupt the action of the syrup-dropper.

It is desirable that the operator be enabled to interrupt the action of the syrup-dropper at any time, in case of any derangement in the mechanism, or the absence of a tray beneath the dropper at the proper time. Accordingly a hand-lever 199 is pivoted on the frame of the machine, as shown in Fig. 11, with its lower end in position to engage the lever 194, and by swinging the lever 199 to the left the lever 194 may be moved to throw the trip 189 into operative position, so as to disengage the clutch 186—187 regardless of the operation of the cam-mechanism by which this function is normally performed.

The mechanism by which the parts of the syrup-dropper are actuated comprise two slides, which move in dove-tailed recesses in a slide-guide 201 (Fig. 5) mounted on a bracket 202 projecting from the frame of the machine. One of these slides 203 is connected, by a rod 204, with the rocking arm 178 above referred to, as shown in Fig. 1, while the other slide 205 serves to actuate the rock-shaft 182 through connections hereinafter described. The slide 203 is actuated by means of a cam 206 fixed on the shaft 183, while the slide 205 is actuated by a cam 207, which engages two rollers 208 journaled on the slide. The cam 206 coöperates with similar rollers (not shown) on the slide 203.

The slide 205 is connected, by a short link 209, with a lever 211 which is pivoted, at 212, on the frame of the machine, so that it may have a rocking motion about a horizontal axis. The lower part of the lever is segmentally curved and carries a slide 213. This slide is connected, by a rod 214, with a rock-arm 216 on the rock-shaft 182, a universal joint being used for this purpose to provide for the relative angular movements of the parts. The rocking movement imparted to the lever 211 by the slide 205 is transmitted, through the connections just described, to the rock-shaft 182, which results in longitudinal movements of the piston-rod 115 of the syrup-dropper. It is desirable to adjust the amplitude of movement of the piston-rod to regulate the amount of syrup deposited in the depressions of the mold. For this purpose the slide 213 is employed, this slide being movable, along the lever 211, to a variable distance from the pivotal axis 212. The slide is provided with a nut 217, which engages a threaded rod 218 journaled in the lever 211 and provided with a hand-wheel 219 by which it may be turned. Rotation of the rod 218 causes longitudinal movement of the nut 217 thereon, and this nut, being in engagement with a transverse slot in the slide 213, causes a longitudinal movement of the slide upon the lever 211.

In depositing syrup in the molds from the syrup-dropper it has been found that the distance of the mold beneath the syrup-dropper should be accurately regulated, according to the amount of syrup in each deposit, and to the consistency of the syrup. If the mold be too far from the dropper the syrup may be dropped with such force as to derange the starch, while it must be far enough to permit the charge of syrup to fall clear of the dropper before the tray is moved to bring the next row into position. Since the syrup-dropper is usually provided with steam-connections by which it may be heated to keep the syrup in fluid condition, and also owing to the mechanical connections by which the parts of the syrup-dropper are actuated, it is desirable to have the syrup-dropper fixed in permanent position, but owing to the variation in the size of the mold-impressions and in the consistency of the various syrups by which they are filled, it is desirable to provide for vertical adjustment between the syrup-dropper and the means by which the starch-trays are supported.

In the present machine the adjustment just referred to is provided for as follows: The table 14 is supported, as shown in Fig. 4, by downward projections 221 which have rack-teeth meshing with pinions 223. These pinions are fixed on transverse shafts 224 journaled on a transverse member 225 on the frame of the machine. To rotate the shafts 224 in unison and raise or lower the table, each shaft is provided with a worm-wheel 226 meshing with one of two worms 227 on a shaft 228 which extends longitudinally of the machine, and is also journaled on the frame member 225. By means of a hand-wheel 229 at the front of the machine the shaft 228 may be rotated as required.

The forward portions of the rails 65 are mounted and supported upon the table 14 as before described. To support the rear portions of the rails and cause them to participate in the vertical adjustment, these rear portions of the rails are supported by depending members 231 which are operatively connected with the shaft 228 through gearing similar to that just described, as shown in Fig. 4.

To coördinate the movements of the pattern-support and the pattern with the vertical adjustment of the table and the supporting-rails, means are provided for raising and lowering the rods 26 with relation to the cam-slides by which they are actuated. For this purpose a worm-gear 232 is fixed on the shaft 228, and this gear meshes with a worm-gear 233 fixed on a transverse shaft 234 journaled on the frame of the machine. At each end of the shaft 234 is a worm-gear 235 which meshes with a worm-gear 236 surrounding one of the rods 26. The gears 236 are loose upon the rods, but have a key-and-spline connection therewith, as indicated in dotted lines in Fig. 2, so that rotation of the gears 236 causes rotation of the rods. Vertical movement of the gears 236 is prevented by means of bearing-caps 237 in which they are mounted. When the rods 26 are rotated they are caused to screw upwardly or downwardly, at their lower ends, in the upper extremities 34 of the cam-slides, and the vertical movement so produced is exactly equal to the vertical movement produced simultaneously in the table 14 in consequence of the rotation of the shaft 228, so that the path of movement of the pattern-support always begins and ends at the same distance from the table 14 regardless of the adjusting operation just described.

In case it be desired to adjust the relative position of the pattern-support and the table without changing the vertical position of the table, in order to accommodate the machines to starch-trays of different depths, this may be done, after removing a pin 332 by which the worm-gear 232 is fixed to the shaft 228, by rotating the shaft 234 independently of the shaft 238, by means of a hand-wheel 239, shown in Fig. 2, at the right-hand end of the shaft 234.

Since the counterbalancing springs 43, by which the weight of the pattern-support is partly sustained, coöperate directly with the rods 26, the vertical adjustment of these rods tends to change the degree of compression of the springs. This is provided against, however, by the use of the threaded sleeves 44 on which the lower ends of the springs rest. These sleeves are keyed to the rods 26, as shown in Fig. 2, and are threaded to the same pitch as the lower ends 33 of the rods. Accordingly, when the rods are screwed upwardly or downwardly in the cam-slides the sleeves 44 are screwed upwardly or downwardly, through an equal distance, in the frame members 45 in which they are supported, thus maintaining a constant degree of compression in the springs 43.

The operation of the machine as a whole is as follows: The operator throws the driving-clutch into operation by means of the hand-lever 70, and then places trays upon the forward portions of the rails 65, and these trays are conveyed successively and intermittently, by the first conveyer, into position beneath the pattern-support. The pattern is then brought automatically into engagement with the starch in each tray, and, after the completion of this mold-forming operation, each tray in succession is brought to the intermediate position 12. The second conveyer then removes each tray in succession from the position 12 to a position beneath the syrup-dropper, with the first row of impressions directly beneath the orifices of the dropper. The dropper then emits the material to fill this first row of impressions, and the second conveyer then makes a short movement whereby the tray is advanced sufficiently to bring the second row of impressions beneath the dropper. This operation of the second conveyer is repeated until all the rows have been filled, whereupon the second conveyer makes a longer movement, whereby the filled tray is removed to the right upon the rails 65, and another tray from the intermediate position is brought into position beneath the dropper.

The rails 65 are shown as of indeterminate length at their right-hand ends. They may be extended to any convenient degree to provide for supporting the filled trays until they can be conveniently removed by an attendant.

My invention is not limited to the embodiment thereof hereinbefore described and illustrated in the accompanying drawings, but it may be embodied in various other forms within the nature of the invention as it is defined in the following claims.

I claim:—

1. A starch-molding machine having, in combination, a syrup-dropper; mold-forming means; a first conveyer adapted to convey starch-trays from the mold-forming means to an intermediate point; a second conveyer adapted to receive the trays from the first conveyer and to convey them beneath and beyond the syrup-dropper; mechanism for actuating the second conveyer in a series of steps according to the distance between rows of impressions in the starch, said means being adjustable to vary but predetermine the number of such steps; mechanism for actuating the first conveyer independently of the second conveyer; and means connected with, and actuated by, the actuating-mechanism of the second conveyer, for throwing the actuating mechanism of the first conveyer automatically into operation at a predetermined time in the operation of the second conveyer, said means being adjustable to vary said time of operation.

2. A starch-molding machine having, in combination with a syrup-dropper and a pattern-support, horizontal ways, for supporting starch-trays, extending beneath and between said dropper and support; mechanism for moving the pattern-support vertically to cause the pattern to operate upon starch in a tray upon the ways; and means for adjusting simultaneously and equally, in a vertical direction, the height of the ways, to vary their distance below the syrup-dropper; and said mechanism to vary the path of movement of the pattern-support and maintain the operative relation between the pattern-support and the ways.

3. A starch-molding machine having, in combination, a syrup-dropper, mold-forming means, a main power shaft, connections between said mold-forming means and said main shaft adapted to operate the mold-forming means intermittently, a first conveyer adapted to convey trays beyond the mold-forming means, operative connections between said first conveyer and said driving shaft adapted to operate said first conveyer intermittently, a second conveyer adapted to receive the trays from the first conveyer and convey them beneath and beyond the syrup-dropper, operative connections between said second conveyer and said main shaft adapted to drive said second conveyer independently of said first conveyer, and means actuated by said operative connections between said second conveyer and said main shaft for disengaging automatically the connections between the first conveyer and the main shaft when a tray has been conveyed by it beyond the mold-forming means.

4. A starch-molding machine having, in combination, a syrup-dropper, mold-forming means, a main power shaft, connections between said mold-forming means and said main shaft adapted to operate the mold-forming means intermittently, a first conveyer adapted to convey trays beyond the mold-forming means, operative connections between said first conveyer and said driving shaft adapted to operate said first conveyer intermittently, a second conveyer adapted to receive the trays from the first conveyer and convey them beneath and beyond the syrup-dropper, operative connections between said second conveyer and said main shaft adapted to drive said second conveyer by uninterrupted step-by-step movement independently of said first conveyer, and means actuated by the movement of said second conveyer for disengaging automatically the connections between the first conveyer and the main shaft when the first conveyer has conveyed a tray beyond the mold-forming means.

5. A starch-molding machine having, in combination, a syrup-dropper, mold-forming means, a main power shaft, connections between said mold-forming means and said main shaft adapted to operate the mold-forming means intermittently, a first conveyer adapted to convey trays beyond the mold-forming means, operative connections between said first conveyer and said driving shaft adapted to operate said first conveyer intermittently, a second conveyer adapted to receive the trays from the first conveyer and convey them beneath and beyond the syrup-dropper, mechanism for imparting to the second conveyer a step-by-step movement corresponding to the distance between rows of impressions in the tray, followed by a longer movement to convey the tray beyond the dropper, and means actuated by the movement of said second conveyer for disengaging automatically the connections between the first conveyer and the main shaft when the first conveyer has conveyed a tray beyond the mold-forming means.

6. A starch-molding machine having, in combination, a syrup-dropper, mold-forming means, a main power shaft, connections between said mold-forming means and said main shaft adapted to operate the mold-forming means intermittently, a first conveyer adapted to convey trays beyond the mold-forming means, operative connections between said first conveyer and said driving shaft adapted to operate said first conveyer intermittently, a second conveyer adapted to receive the trays from the first conveyer and convey them beneath and beyond the syrup-dropper, a cam-shaft operatively connected with said second conveyer, a pawl and ratchet mechanism between said cam-shaft and said main shaft, cam-actuated means for disengaging automatically the connections between the first conveyer and the main shaft when a tray has been conveyed beyond the mold-forming means.

7. A starch-molding machine having, in combination, a syrup-dropper, mold-forming means, a main power shaft, connections between said mold-forming means and said main shaft adapted to operate the mold-forming means intermittently, a first conveyer adapted to convey trays beyond the mold-forming means, operative connections between said first conveyer and said driving shaft adapted to operate said first conveyer intermittently, a second conveyer adapted to receive the trays from the first conveyer and convey them beneath and beyond the syrup-dropper, a cam-shaft operatively connected with said second conveyer, two distinct pawl and ratchet mechanisms between said cam-shaft and said main shaft, adapted to operate successively to produce intermittent movements of different lengths, a cam rotative with said cam-shaft for disengaging automatically the connections between the first conveyer and the main shaft when a tray has been conveyed beyond the mold-forming means.

8. A starch-molding machine having, in combination, a syrup-dropper, mold-forming means, a main power shaft, connections between said mold-forming means and said main shaft adapted to operate the mold-forming means intermittently, a first conveyer adapted to convey trays beyond the mold-forming means, operative connections between said first conveyer and said driving shaft adapted to operate said first conveyer intermittently, a second conveyer adapted to receive the trays from the first conveyer and convey them beneath and beyond the syrup-dropper, a cam-shaft operatively connected with said second conveyer, two distinct pawl and ratchet mechanisms between said cam-shaft and said main shaft, adapted to operate successively to produce intermittent movements of different lengths, including an eccentric in each driving connection whereby the driving movement of each mechanism is accelerated at the beginning of its movement and retarded at the end of its movement.

9. A starch-molding machine having, in combination, a syrup-dropper, mold-forming means, a main power shaft, a first conveyer adapted to convey trays beneath and beyond the mold-forming means, operative connections between said first conveyer and said main shaft, including a clutch, a second conveyer adapted to receive the trays from the first conveyer and convey them beneath and beyond the syrup-dropper, a cam-shaft operatively connected with said second conveyer, driving connections between said cam-shaft and said main shaft, and cam-actuated means adapted to disengage said clutch in the connections between the first conveyer and said main shaft when the tray carried by the first conveyer is under the mold-forming means and again when the tray is moved beyond the mold-forming means.

10. A starch-molding machine having, in combination, a syrup-dropper, mold-forming means, a main power shaft, a first conveyer adapted to convey trays beneath and beyond the mold-forming means, a second conveyer adapted to receive the trays from the first conveyer and convey them beneath and beyond the syrup-dropper, independent driving connections between said main shaft and said conveyers, and cam mechanism actuated by the driving connections with the main shaft for controlling the operation of the syrup-dropper.

JOHN WERNER.

Witnesses:
FARNUM F. DORSEY,
D. GURNEE.

Copies of this patent may be obtained for five cents each, by addressing the "Commissioner of Patents Washington, D. C."